United States Patent
Cariou et al.

(10) Patent No.: US 11,917,677 B2
(45) Date of Patent: Feb. 27, 2024

(54) ENHANCED CHANNEL ACCESS FOR MULTI-LINK DEVICES

(71) Applicant: Intel Corporation, Santa Clara, CA (US)

(72) Inventors: Laurent Cariou, Milizac (FR); Dmitry Akhmetov, Hillsboro, OR (US); Dibakar Das, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 150 days.

(21) Appl. No.: 17/358,602

(22) Filed: Jun. 25, 2021

(65) Prior Publication Data

US 2021/0321450 A1 Oct. 14, 2021

Related U.S. Application Data

(60) Provisional application No. 63/056,024, filed on Jul. 24, 2020.

(51) Int. Cl.
*H04W 74/00* (2009.01)
*H04W 76/15* (2018.01)

(52) U.S. Cl.
CPC ......... *H04W 74/002* (2013.01); *H04W 76/15* (2018.02)

(58) Field of Classification Search
CPC .................................................. H04W 74/002
USPC ......................................................... 370/329
See application file for complete search history.

(56) References Cited

U.S. PATENT DOCUMENTS

2021/0266960 A1* 8/2021 Lu ..................... H04W 74/0808

FOREIGN PATENT DOCUMENTS

EP       3716722 A1 *  9/2020   ............ H04W 48/16

* cited by examiner

*Primary Examiner* — Gbemileke J Onamuti
(74) *Attorney, Agent, or Firm* — Eversheds Sutherland (US) LLP

(57) ABSTRACT

This disclosure describes systems, methods, and devices related to channel access for multi-link devices (MLDs). A MLD may identify a first backoff count associated with a first enhanced distributed channel access function (EDCAF) for a first communication link used by the MLD; identify a second backoff count associated with a second EDCAF for a second communication link used by the MLD, the first backoff count less than the second backoff count; determine a time period after that the first backoff count reaches zero and during which to refrain from transmitting using the first communication link, the time period based on the second backoff count; determine that the first communication link transitioned from an idle state to a busy state during the time period; and generate a third backoff count associated with the first EDCAF based on the first communication link transitioning to the busy state during the time period.

20 Claims, 14 Drawing Sheets

ENHANCED CHANNEL ACCESS FOR MULTI-LINK DEVICES

CROSS-REFERENCE TO RELATED APPLICATION(S)

This application is related to and claims priority to U.S. Provisional Application No. 63/056,024, filed Jul. 24, 2020, which is hereby incorporated herein by reference in its entirety.

TECHNICAL FIELD

This disclosure generally relates to systems and methods for wireless communications and, more particularly, to enhanced channel access for multi-link devices.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1A:
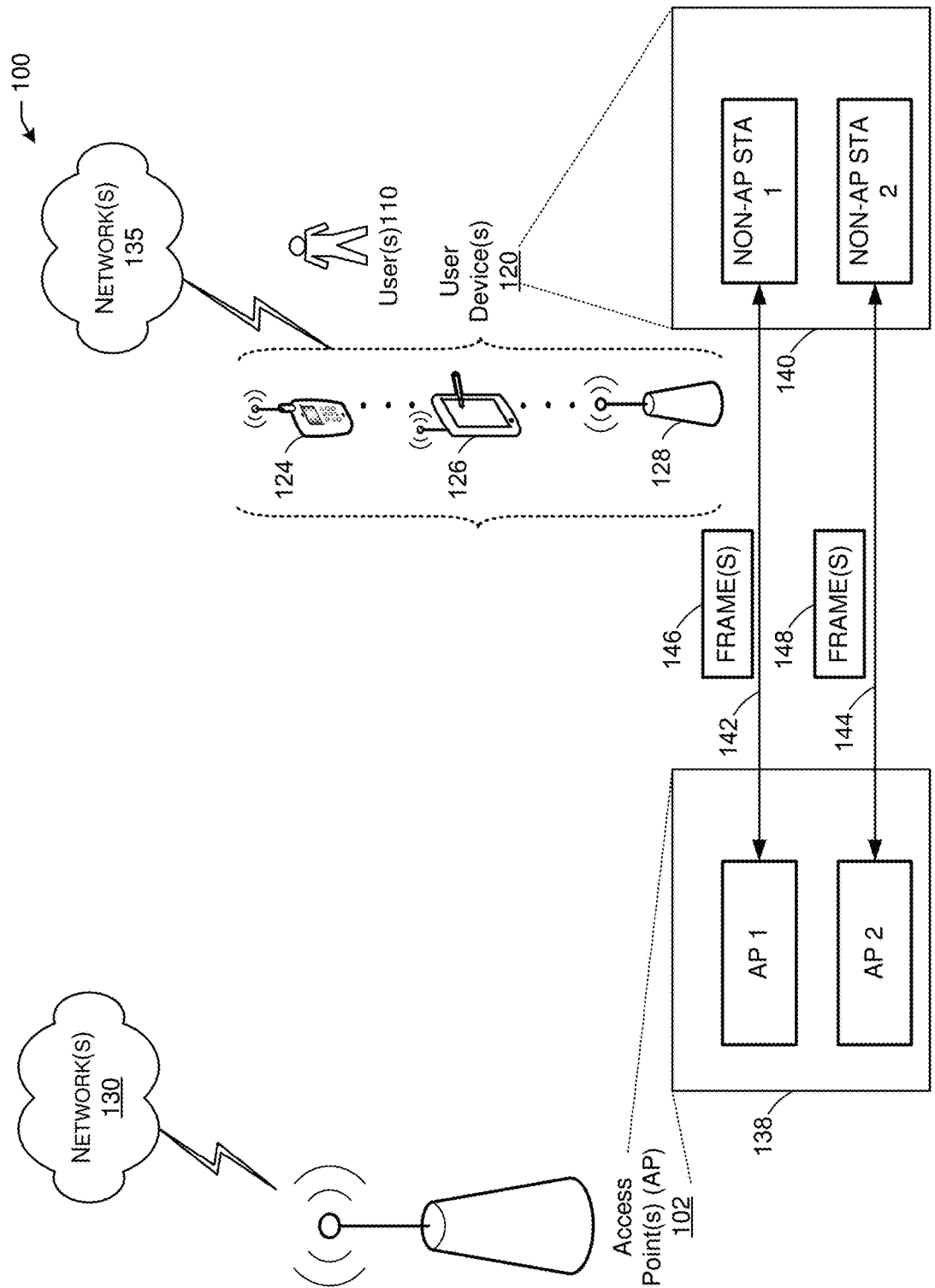
FIG. 1A is a network diagram illustrating an example network environment of multi-link devices (MLDs), in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

The IEEE 802.11 technical standards define wireless communications, including the way that Wi-Fi devices access wireless communication channels. For example, the IEEE 802.11 technical standards provide an enhanced distributed channel access function (EDCAF) for contention-based channel access in which devices compete for access to wireless communication channels. Channel access for multi-link devices (MLDs) provides new challenges.

A station (STA) may refer to a logical entity that is a singly addressable instance of a medium access control (MAC) and physical layer (PHY) interface to the wireless medium (WM). A communication link (or just "link") in the context of an IEEE 802.11 medium access control (MAC) entity, may refer to a physical path consisting of exactly one traversal of the wireless medium (WM) that is usable to transfer MAC service data units (MSDUs) between two STAs.

In multi-link communications, a multi-link device (MLD), also referred to as a multi-link logical entity (MLLE), may refer to a device that has more than one affiliated STA and that has a medium access control (MAC) layer (e.g., of a communication layer stack) service access point (SAP) to a logical link control (LLC), which may include a MAC data service. An AP MLD (A MLD) may refer to an AP device, where each STA affiliated with the STA MLD is an AP. A non-AP ML device (non-AP MLD) maybe an A MLD, where each STA affiliated with the MLD is a non-AP STA. A MLD may be considered a logical/virtual entity with multiple STAs (e.g., AP STAs or non-AP STAs), and each STA concurrently may use separate communication links with corresponding STAs of another MLD. In this manner, a MLD may communicate over multiple communication links concurrently without having to drop one communication link to allow for establishing another communication link.

Multi-link operation (MLO) is an important 802.11be feature, which allow a device to communicate to another device using multiple links on different channels/bands. A device supporting multiple links is a MLD.

In general, some STA MLDs may have high leakage, which prevents the MLDs from simultaneously transmitting and receiving on different links. Such a device is referred to as a non-STR MLD and is typically expected to be a non-AP STA MLD. Such a device may not be able to utilize the benefits of multi-link in uplink (UL) communications using enhanced distributed channel access (EDCA) based channel access. This occurs as whenever the STA is transmitting on a first link, and the leakage may cause its other link to suspend EDCA.

The most straight-forward way to solve this problem is to ensure that the transmissions from the STA MLD on the two links start at the same time. However, using the baseline EDCA mechanism the opportunities of the STA MLD having zero back-off count at the same time in both links is low.

Some solutions may be proposed with the central premise that a STA that is counting down its back off can pause or extend its backoff counter value at some value so as to have multiple STAs of a same MLD transmit simultaneously on both links.

Some point coordination function inter frame space (IFS, PIFS)-based access proposals may be unfair to other STAs on a channel, as with respect to those STAs, the 802.11be Extremely High Throughput (EHT) STA has a greater chance to gain more channel access. In addition, some existing proposals do not allow a MLD STA to increase its backoff counter before the backoff counter reaches zero in order to align with a backoff counter used by another STA of the MLD.

There is therefore a need for enhanced channel access for MLDs.

Example embodiments of the present disclosure relate to systems, methods, and devices for enhanced channel access for MLDs.

In one or more embodiments, in 802.11be EDCA, to align the backoff counters of two STAs of a same MLD, while the STA is counting down its backoff counter (e.g., before the backoff counter reaches zero), the STA may increase the backoff count for an EDCAF to match or be smaller than a non-zero value of a second backoff count used by another STA of the same MLD. In this manner, the increase of a backoff counter to align two backoff counters used by different channels may occur during the backoff count, prior to expiration of the backoff count.

In one or more embodiments, in 802.11be EDCA, to align the backoff counters of two STAs of a same MLD, a backoff count of a STA of a MLD may reach zero. When the first backoff count of the first STA of the MLD is zero, and the communication link used by the second STA of the MLD is busy after the first backoff count of the first STA of the MLD reaches zero, the first STA either may transmit using its communication link, or may generate a new backoff count to use for an EDCAF. The new backoff count may use the same contention window or a different contention window than the expired backoff count EDCAF used (e.g., when a STA is in a backoff state because a channel is busy, the STA may wait a period of time referred to as a contention window before trying again to access the channel).

In one or more embodiments, in 802.11be EDCA, to align the backoff counters of two STAs of a same MLD, a backoff count of a STA of a MLD may reach zero. When the first backoff count of the first STA of the MLD is zero, if the other communication link used by another STA of the same MLD becomes busy after the first backoff count of the first STA of the MLD reaches zero (e.g., if the other communication link used by another STA of the same MLD transitions from a non-busy/idle state to a busy state), the first STA either may transmit or generate a new backoff count to use for an EDCAF. The new backoff count may use the same contention window or a different contention window than the expired backoff count EDCAF used.

In one or more embodiments, in 802.11be EDCA, to align the backoff counters of two STAs of a same MLD, a backoff count of a STA of a MLD may reach zero. When the first backoff count of the first STA of the MLD is zero, if the communication link used by the first STA becomes busy (e.g., transitions from an idle state to a busy state), the first STA may refrain from transmitting, and instead may generate a new backoff count to use for an EDCAF. The new backoff count may use the same contention window or a different contention window than the expired backoff count EDCAF used. This scenario may occur when the first STA's backoff counter has expired, and the first STA is waiting for an extra time period in order to align its backoff counter with the backoff counter used by the second STA of the MLD (e.g., waiting for the second backoff counter also to expire so that the MLD may access both communication links and transmit using both links at the same time).

In one or more embodiments, a MLD may initiate transmission on two links simultaneously only if at least one of the links has a corresponding EDCAF that just counted down to zero (i.e., the count is at a slot boundary) and the other link is holding its backoff counter value for the corresponding EDCAF at zero.

In one or more embodiments, after counting down its backoff for some EDCAF to zero, a STA MLD may decide not to transmit any frame for that EDCAF, but hold its backoff count for that EDCAF at zero.

In one or more embodiments, if a STA in MLD that is holding its backoff count at zero wants to transmit a frame using that EDCAF, it shall only transmit after generating a new backoff counter value and resuming regular EDCA operation.

Benefits of the enhancements provided by the present disclosure include improving throughput for an EHT STA without affecting fair channel access for other STAs, and allowing STAs to adjust a backoff counter before the backoff count expires.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1A is a network diagram illustrating an example network environment 100 of MLDs, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 4:
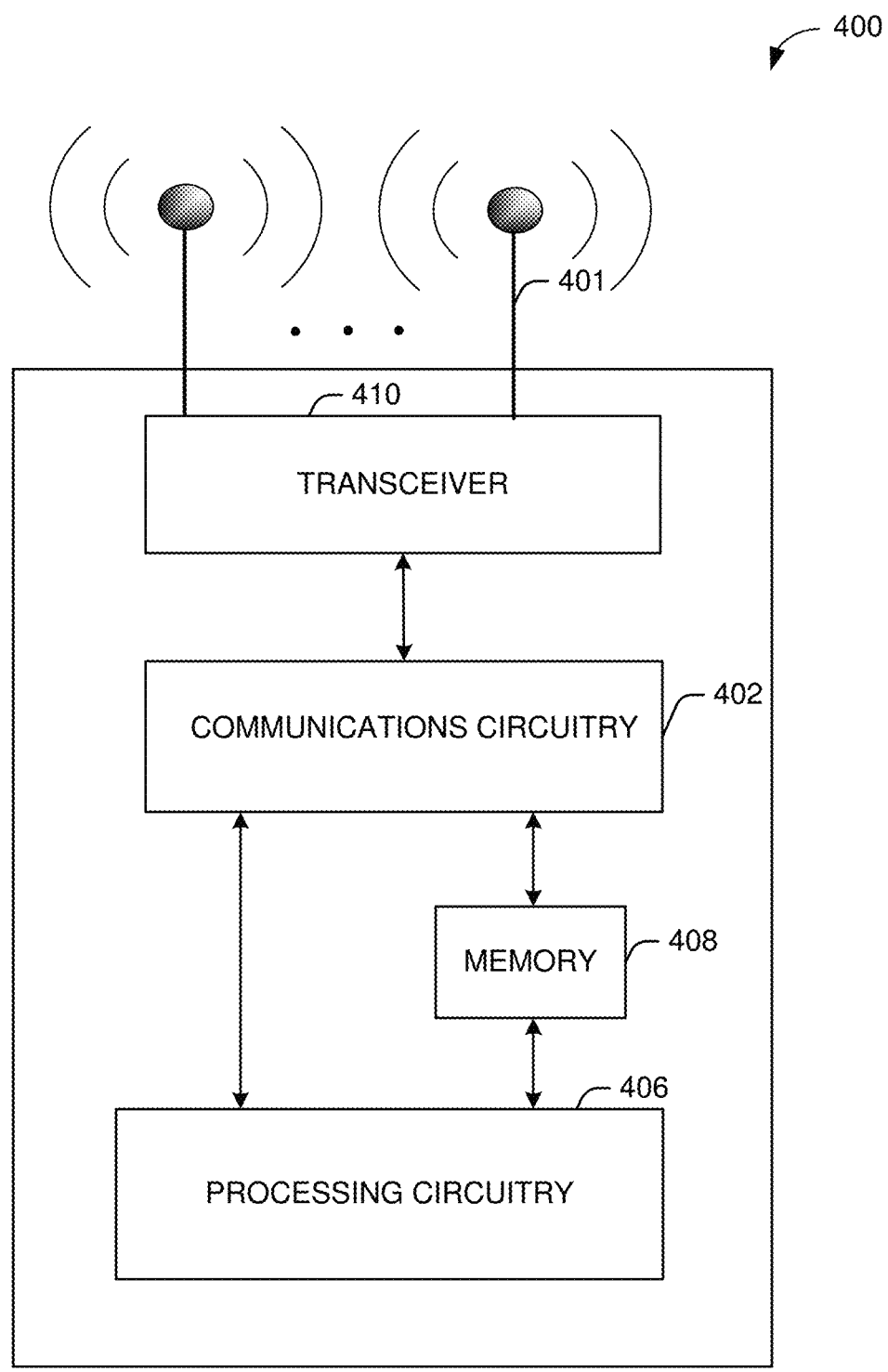
FIG. 4 illustrates a functional diagram of an exemplary communication station that may be suitable for use as a user device, in accordance with one or more example embodiments of the present disclosure.
Figure 5:
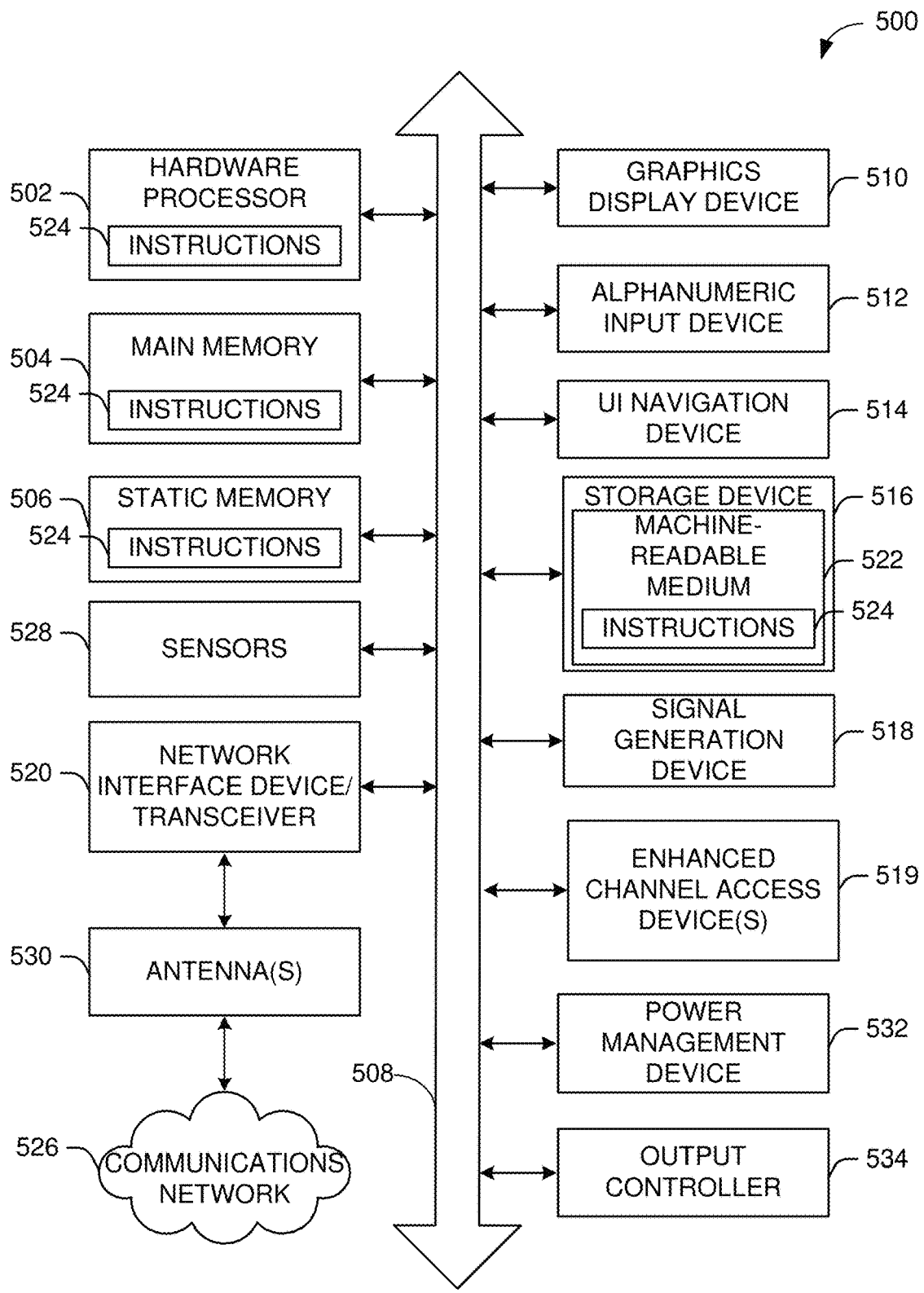
FIG. 5 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 4 and/or the example machine/system of FIG. 5.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one or more embodiments, and with reference to FIG. 1, AP 102 may be considered an A MLD 138 logical/virtual entity with multiple AP STAs (e.g., AP 1 and AP 2), and a user device of the user devices 120 may be considered a MLD 140 logical/virtual entity with multiple non-AP STAs (e.g., non-AP STA 1 and non-AP STA 2). A first link 142 may be established between the AP 1 and the non-AP STA 1, and a second link 144 may be established between the AP 2 and the non-AP STA 2. Both the first link 142 and the second link 144 may be used simultaneously (e.g., the AP 102 and/or the user device 120 do not need to drop one of the links to use the other link). One or more frames 146 may be sent across the first link 142, and one or more frames 148 may be sent across the second link 144. To access the first link 142, the non-AP STA 1 may use a first EDCAF with a first backoff counter. To access the second link 144, the non-AP STA 2 may use a second EDCAF with a second backoff counter. The first and second backoff counters may be unaligned, so either non-AP STA 1 or non-AP STA 2 may increase its backoff counter to align with the other backoff counter to avoid leakage, according to one of the scenarios described below.

In one or more embodiments, in 802.11be EDCA, to align the backoff counters of two STAs of the MLD 140, while the non-AP STA 1 is counting down its backoff counter (e.g., before the backoff counter reaches zero), the non-AP STA 1 may increase the backoff count for an EDCAF to match or be smaller than a non-zero value of a second backoff count used by the non-AP STA 2 of the MLD 140. In this manner, the increase of a backoff counter to align two backoff counters used by different channels (e.g., the first link 142 and the second link 144) may occur during the backoff count, prior to expiration of the backoff count.

In one or more embodiments, in 802.11be EDCA, to align the backoff counters of two STAs of the MLD 140, a backoff count of the non-AP STA 1 may reach zero. When the first backoff count of the non-AP STA 1 of the MLD 140 is zero, and the communication link used by the non-AP STA 2 of the MLD 140 is busy after the first backoff count of the non-AP STA 1 reaches zero, the non-AP STA 1 either may transmit using the first link 142, or may generate a new backoff count to use for an EDCAF. The new backoff count may use the same contention window or a different contention window than the expired backoff count EDCAF used.

In one or more embodiments, in 802.11be EDCA, to align the backoff counters of two STAs of the MLD 140, a backoff count of non-AP STA 1 may reach zero. When the first backoff count of the non-AP STA 1 is zero, if the second link 144 used by non-AP STA 2 of the MLD 140 becomes busy after the first backoff count of the non-AP STA 1 reaches zero (e.g., if the second link 144 transitions from a non-busy/idle state to a busy state), the non-AP STA 1 either may transmit or generate a new backoff count to use for an EDCAF. The new backoff count may use the same contention window or a different contention window than the expired backoff count EDCAF used.

In one or more embodiments, in 802.11be EDCA, to align the backoff counters of two STAs of the MLD 140, a backoff count of non-AP STA 1 may reach zero. When the first backoff count of the non-AP STA 1 is zero, if the first link 142 used by the non-AP STA 1 becomes busy (e.g., transitions from an idle state to a busy state), the non-AP STA 1 may refrain from transmitting, and instead may generate a new backoff count to use for an EDCAF. The new backoff count may use the same contention window or a different contention window than the expired backoff count EDCAF used. This scenario may occur when the non-AP STA 1 backoff counter has expired, and the non-AP STA 1 is waiting for an extra time period in order to align its backoff counter with the backoff counter used by the non-AP STA 2 (e.g., waiting for the second backoff counter also to expire so that the MLD 140 may access both communication links 142 and 144 and transmit using both links at the same time).

In one or more embodiments, the MLD 140 may initiate transmission on two links simultaneously only if at least one of the links has a corresponding EDCAF that just counted down to zero (i.e., the count is at a slot boundary) and the other link is holding its backoff counter value for the corresponding EDCAF at zero.

In one or more embodiments, after counting down its backoff for some EDCAF to zero, non-AP STA 1 may decide not to transmit any frame for that EDCAF, but hold its backoff count for that EDCAF at zero.

In one or more embodiments, if non-AP STA 1 is holding its backoff count at zero wants to transmit a frame using that EDCAF, it shall only transmit after generating a new backoff counter value and resuming regular EDCA operation.

Figure 1B:
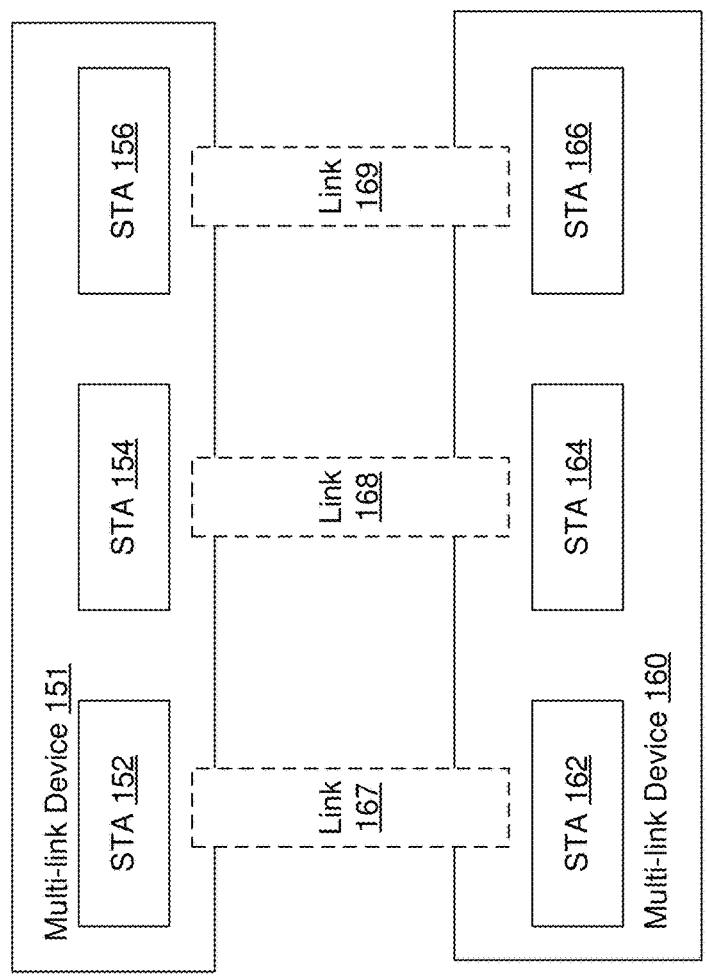
FIG. 1B depicts an illustrative schematic diagram for MLD communications between two logical entities, in accordance with one or more example embodiments of the present disclosure.

FIG. 1B depicts an illustrative schematic diagram 150 for MLD communications between two logical entities, in accordance with one or more example embodiments of the present disclosure.

Referring to FIG. 1B, there are shown two MLDs in communication with each other. MLD 151 may include multiple STAs (e.g., STA 152, STA 154, STA 156, etc.), and MLD 160 may include multiple STAs (e.g., STA 162, STA 164, STA 166, etc.). The STAs of the MLD 151 and the STAs of the MLD 160 may set up links with each other (e.g., link 167 for a first frequency band used by the STA 152 and the STA 162, link 168 for a second frequency band used by the STA 154 and the STA 164, link 169 for a second frequency band used by the STA 156 and the STA 166). In this example of FIG. 1B, the two MLDs may be two separate physical devices, where each one comprises a number of virtual or logical devices (e.g., the STAs).

Figure 1C:
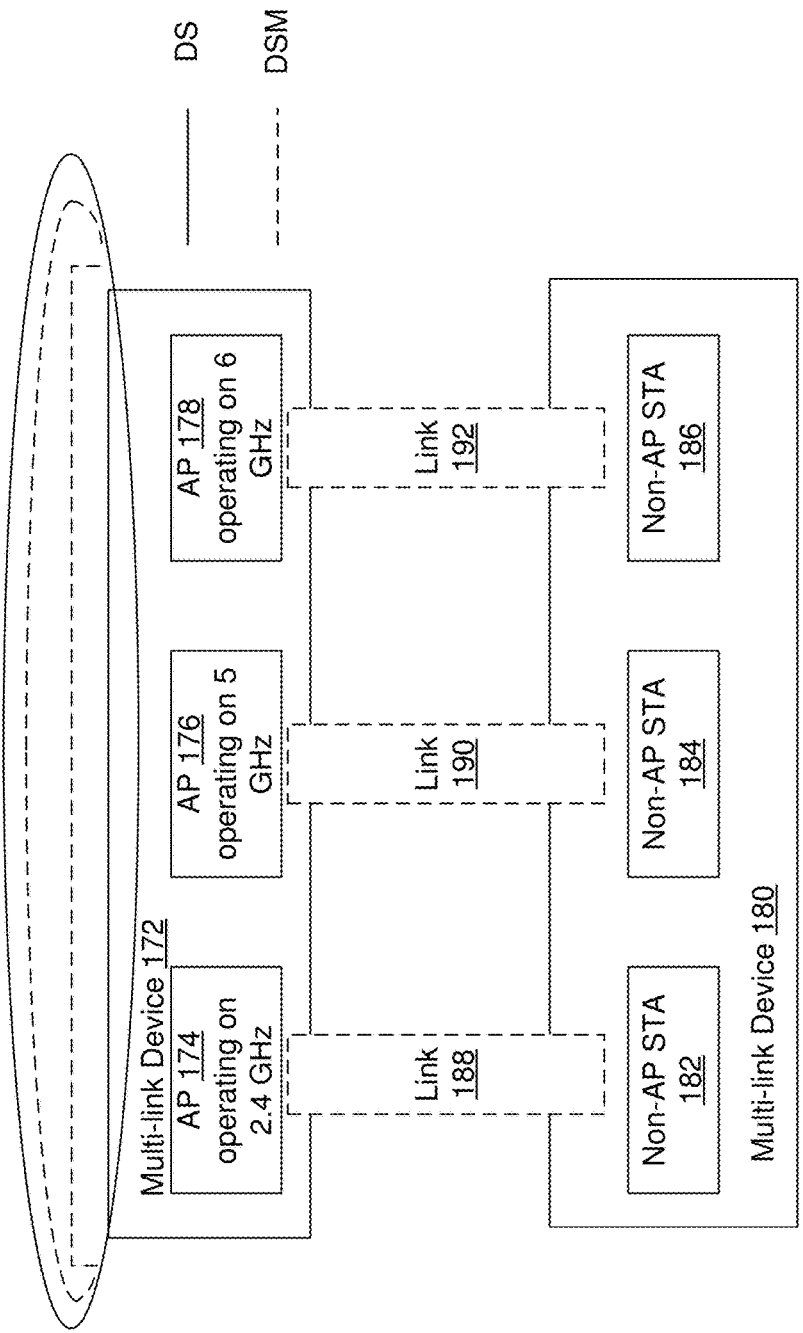
FIG. 1C depicts an illustrative schematic diagram for MLD communications between an access point (AP) MLD with logical entities and a non-AP MLD with logical entities, in accordance with one or more example embodiments of the present disclosure.

FIG. 1C depicts an illustrative schematic diagram for MLD communications between an AP MLD with logical entities and a non-AP MLD with logical entities, in accordance with one or more example embodiments of the present disclosure.

Referring to FIG. 1C, there are shown two MLDs 170 on either side, each which includes multiple STAs that can set up links with each other. For infrastructure framework, MLD 172 may be an A-MLD with logical APs (e.g., AP 174, AP 176, and AP 178) on one side, and MLD 180 may be a non-AP MLD including non-AP logical entities (non-AP STA 182, non-AP STA 184, and non-AP STA 186) on the other side. The detailed definition is shown below. It should be noted that the term MLLE and MLD are interchangeable and indicate the same type of entity. Throughout this disclosure, MLLE may be used but anywhere the MLLE term is used, it can be replaced with MLD. Multi-link non-AP logical entity (non-AP MLLE, also can be referred to as non-AP MLD): A multi-link logical entity, where each STA within the multi-link logical entity is a non-AP EHT STA. It should be noted that this framework is a natural extension from the one link operation between two STAs, which are AP and non-AP STA under the infrastructure framework (e.g., when an AP is used as a medium for communication between STAs).

In the example of FIG. 1C, the MLD 172 and the MLD 180 may be two separate physical devices, where each one comprises a number of virtual or logical devices. For example, the multi-link AP logical entity may comprise three APs, AP 174 operating on 2.4 GHz (e.g., link 188), AP 176 operating on 5 GHz (e.g., link 190), and AP 178 operating on 6 GHz (e.g., link 192). Further, the multi-link non-AP logical entity may comprise three non-AP STAs, non-AP STA 182 communicating with AP 174 on link 188, non-AP STA 184 communicating with AP 176 on link 190, and non-AP STA 186 communicating with AP 178 on link 192.

The MLD 172 is shown in FIG. 1C to have access to a distribution system (DS), which is a system used to interconnect a set of BSSs to create an extended service set (ESS). The MLD 172 is also shown in FIG. 1C to have access a distribution system medium (DSM), which is the medium used by a DS for BSS interconnections. Simply put, DS and DSM allow the AP to communicate with different BSSs.

It should be understood that although the example shows three logical entities within the MLD 172 and the three logical entities within the MLD 180, this is merely for illustration purposes and that other numbers of logical entities with each of the MLDs may be envisioned.

Figure 2A:
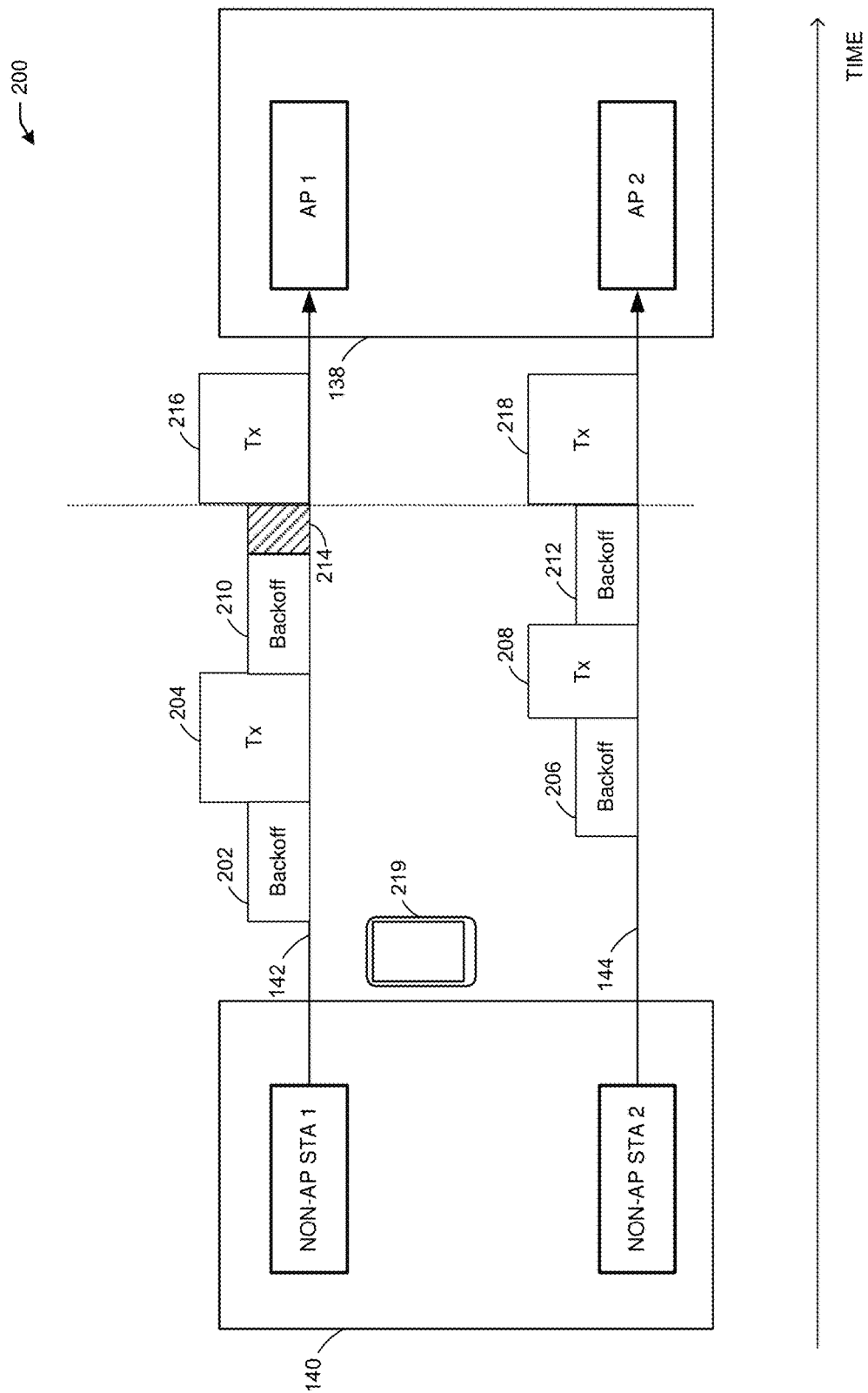
FIG. 2A illustrates a schematic diagram of channel access for MLDs, in accordance with one or more example embodiments of the present disclosure.

FIG. 2A illustrates a schematic diagram 200 of channel access for MLDs, in accordance with one or more example embodiments of the present disclosure.

Referring to FIG. 2A, the A MLD 138 and the MLD 140 of FIG. 1A are shown using respective EDCAFs. In particular, the non-AP STA 1 of the MLD 140 is using the first link 142, and the non-AP STA 2 of the MLD 140 is using the second link 144. The non-AP STA 1 may wait a backoff period 202 (e.g., until expiration of the backoff period 202) before sending a transmission 204 using the first link 142. The non-AP STA 2 may wait a backoff period 206 (e.g., until expiration of the backoff period 206) before sending a transmission 208 using the second link 144. After the transmission 204, the non-AP STA 1 may wait a backoff period 210 that may expire before (e.g., may not be aligned with) a backoff period 212 waited by the non-AP STA 2 after the transmission 208. To align the EDCAFs of the first link 142 and the second link 144 (e.g., to allow for simultaneous transmission of transmission 216 (e.g., a packet, frame, etc.) using the first link 142 and transmission 218 (e.g., a packet, frame, etc.) using the second link 144), the non-AP STA 1 may increase the backoff period 210 before the backoff period 210 expires so that the backoff period 210 plus an extension of time 214 expire at the same time as the backoff period 212.

Still referring to FIG. 2A, whether the first link 142 and/or the second link 144 are idle or busy (e.g., the MLD 140 may access a link when it is idle/not busy, and may wait a backoff time before checking again to see whether a link is still busy) may depend on other devices using the first link 142 and/or the second link 144 (e.g., the device 219).

Figure 2B:
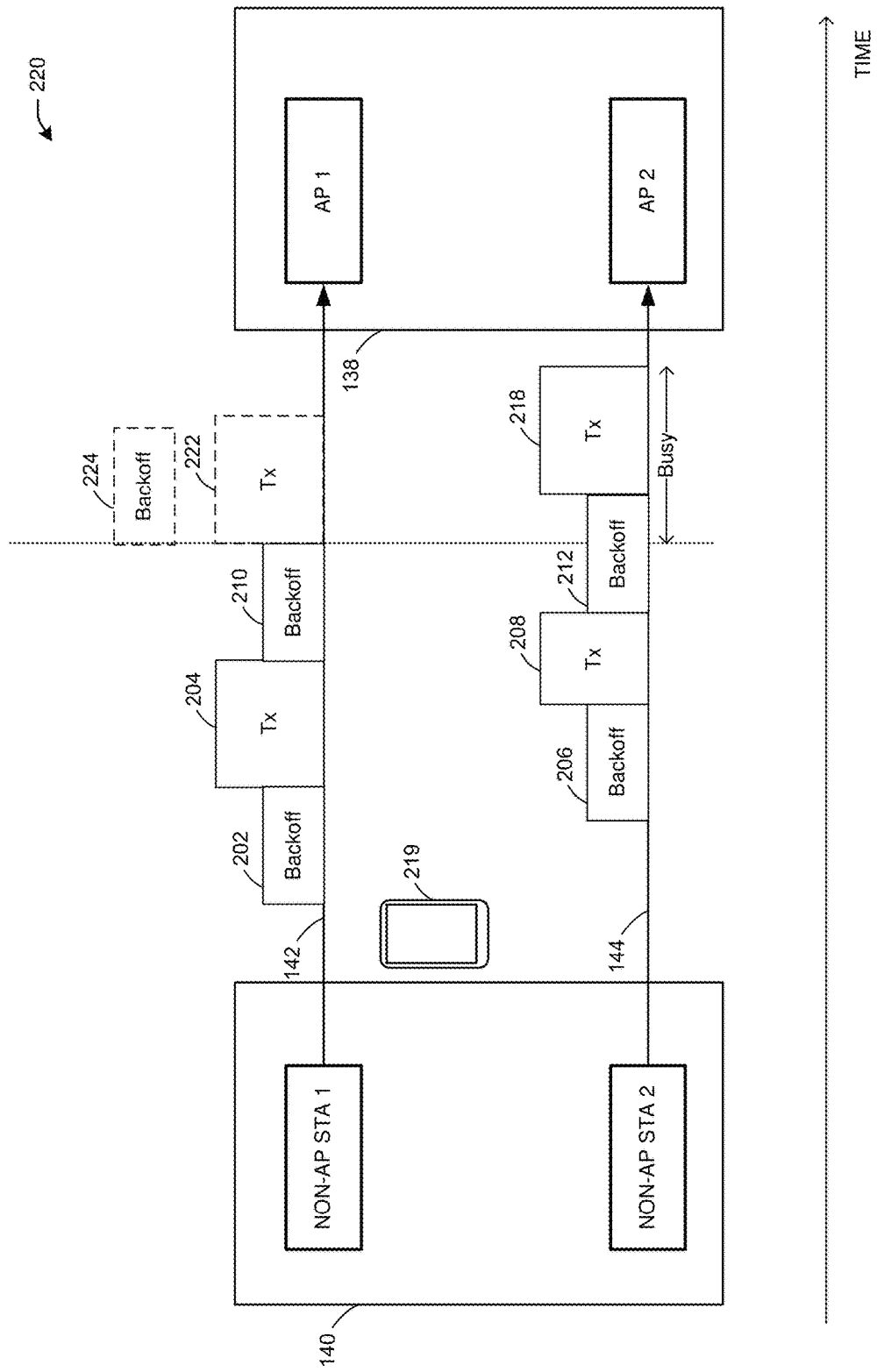
FIG. 2B illustrates a schematic diagram of channel access for MLDs, in accordance with one or more example embodiments of the present disclosure.

FIG. 2B illustrates a schematic diagram 220 of channel access for MLDs, in accordance with one or more example embodiments of the present disclosure.

Referring to FIG. 2B, the A MLD 138 and the MLD 140 of FIG. 1A are shown using respective EDCAFs. In particular, the non-AP STA 1 of the MLD 140 is using the first link 142, and the non-AP STA 2 of the MLD 140 is using the second link 144 as described with respect to FIG. 2A.

Still referring to FIG. 2B, when the backoff period 210 expires (e.g., the count reaches zero), the MLD 140 may determine whether the second link 144 is busy. When the second link 144 is busy at the time when the backoff period 210 expires, the non-AP STA 1 may transmit a transmission 222 or generate another backoff period 224 using the same contention window or different contention window that was used in the backoff period 210.

Still referring to FIG. 2B, whether the first link 142 and/or the second link 144 are idle or busy (e.g., the MLD 140 may access a link when it is idle/not busy, and may wait a backoff time before checking again to see whether a link is still busy) may depend on other devices using the first link 142 and/or the second link 144 (e.g., the device 219). For example, the second link 144 may be busy after expiration of the backoff period 210 due to use of the second link 144 by the non-AP STA 2 or by the device 219.

Figure 2C:
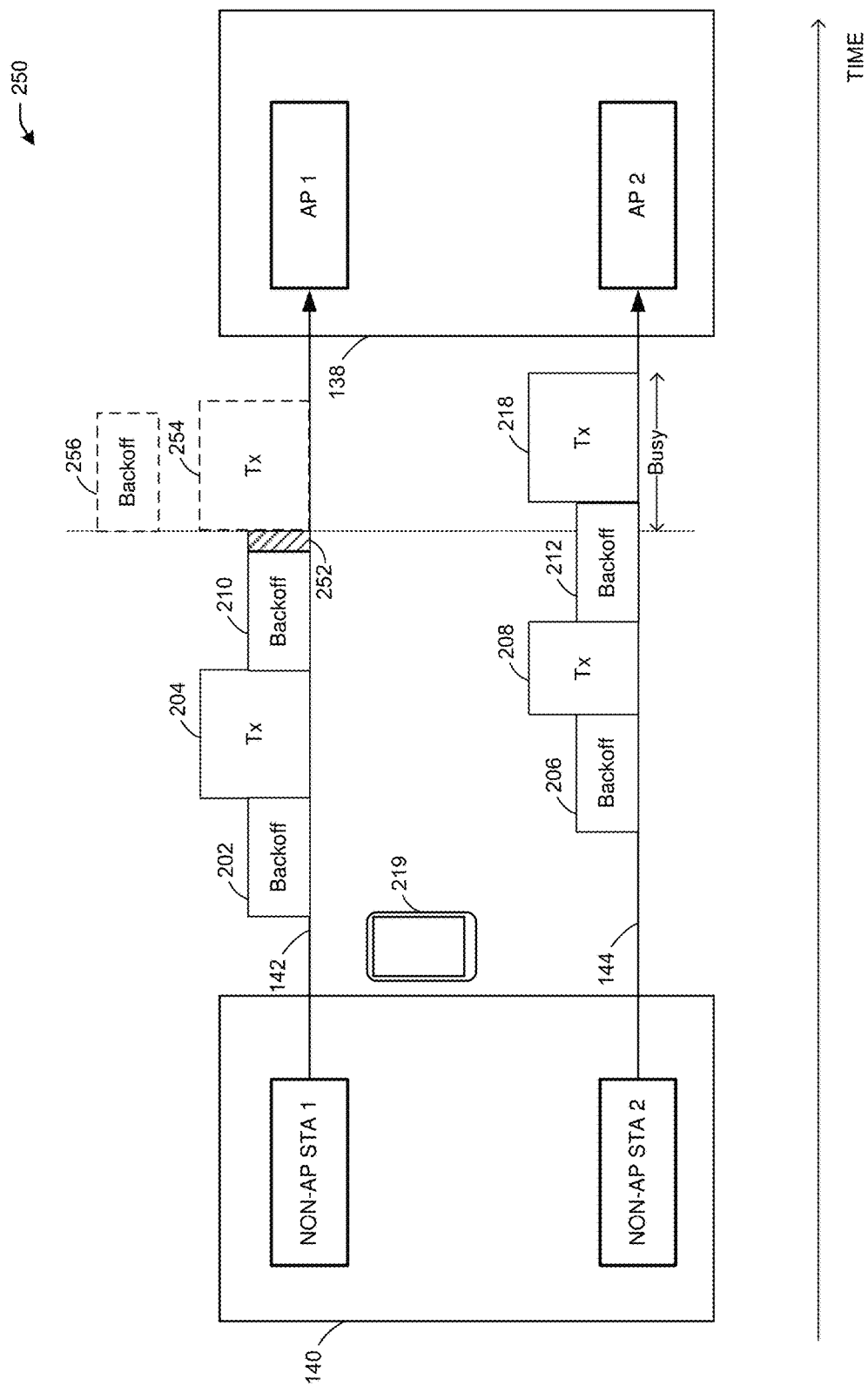
FIG. 2C illustrates a schematic diagram of channel access for MLDs, in accordance with one or more example embodiments of the present disclosure.

FIG. 2C illustrates a schematic diagram 250 of channel access for MLDs, in accordance with one or more example embodiments of the present disclosure.

Referring to FIG. 2C, the A MLD 138 and the MLD 140 of FIG. 1A are shown using respective EDCAFs. In particular, the non-AP STA 1 of the MLD 140 is using the first link 142, and the non-AP STA 2 of the MLD 140 is using the second link 144 as described with respect to FIG. 2A.

Still referring to FIG. 2C, when the backoff period 210 expires (e.g., the count reaches zero), the MLD 140 may determine whether the second link 144 is busy. When the second link is 144 idle at the time when the backoff period 210 expires and then becomes busy during a time period 252 when the non-AP STA 1 is waiting for expiration of the backoff period 212 (e.g., to align the transmissions in the first link 142 and the second link 144), the non-AP STA 1 may transmit a transmission 254 or generate another backoff period 256 using the same contention window or different contention window that used in the backoff period 210.

Still referring to FIG. 2C, whether the first link 142 and/or the second link 144 are idle or busy (e.g., the MLD 140 may access a link when it is idle/not busy, and may wait a backoff time before checking again to see whether a link is still busy) may depend on other devices using the first link 142 and/or the second link 144 (e.g., the device 219). For example, the second link 144 may be busy due to use of the second link 144 by the non-AP STA 2 or by the device 219.

Figure 2D:
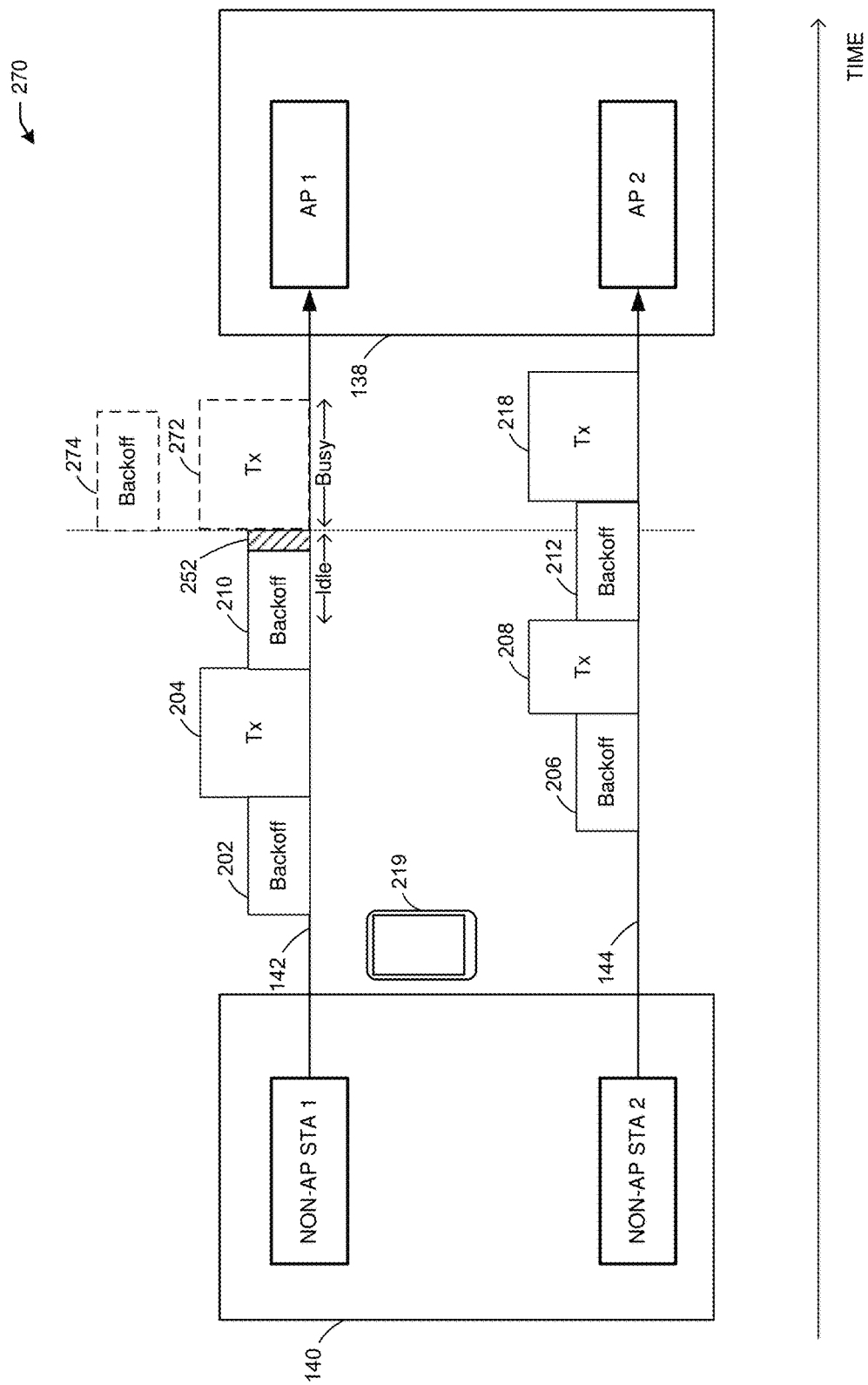
FIG. 2D illustrates a schematic diagram of channel access for MLDs, in accordance with one or more example embodiments of the present disclosure.

FIG. 2D illustrates a schematic diagram 270 of channel access for MLDs, in accordance with one or more example embodiments of the present disclosure.

Referring to FIG. 2D, the A MLD 138 and the MLD 140 of FIG. 1A are shown using respective EDCAFs. In particular, the non-AP STA 1 of the MLD 140 is using the first link 142, and the non-AP STA 2 of the MLD 140 is using the second link 144 as described with respect to FIG. 2A.

Still referring to FIG. 2D, when the backoff period 210 expires (e.g., the count reaches zero), the MLD 140 may determine whether the second link 144 is busy. When the first link 142 idle at the time when the backoff period 210 expires and then becomes busy during the time period 252 when the non-AP STA 1 is waiting for expiration of the backoff period 212 (e.g., to align the transmissions in the first link 142 and the second link 144), the non-AP STA 1 may transmit a transmission 272 or generate another backoff period 274 using the same contention window or different contention window that used in the backoff period 210.

Still referring to FIG. 2D, whether the first link 142 and/or the second link 144 are idle or busy (e.g., the MLD 140 may access a link when it is idle/not busy, and may wait a backoff time before checking again to see whether a link is still busy) may depend on other devices using the first link 142 and/or the second link 144 (e.g., the device 219). For example, the first link 142 may be busy after expiration of the backoff period 210 due to use of the first link 142 by the non-AP STA 2 or by the device 219.

Referring to FIGS. 2A-2D, the channel contention processes may be combined. For example, after the transmission 272 or backoff period 274, any of the contention processes of FIGS. 2A-2D may be implemented, allowing for another extension of a backoff period based on the backoff period of the other link, and/or whether one of the links is busy or idle.

It is understood that the above descriptions are for purposes of illustration and are not meant to be limiting.

Figure 3:
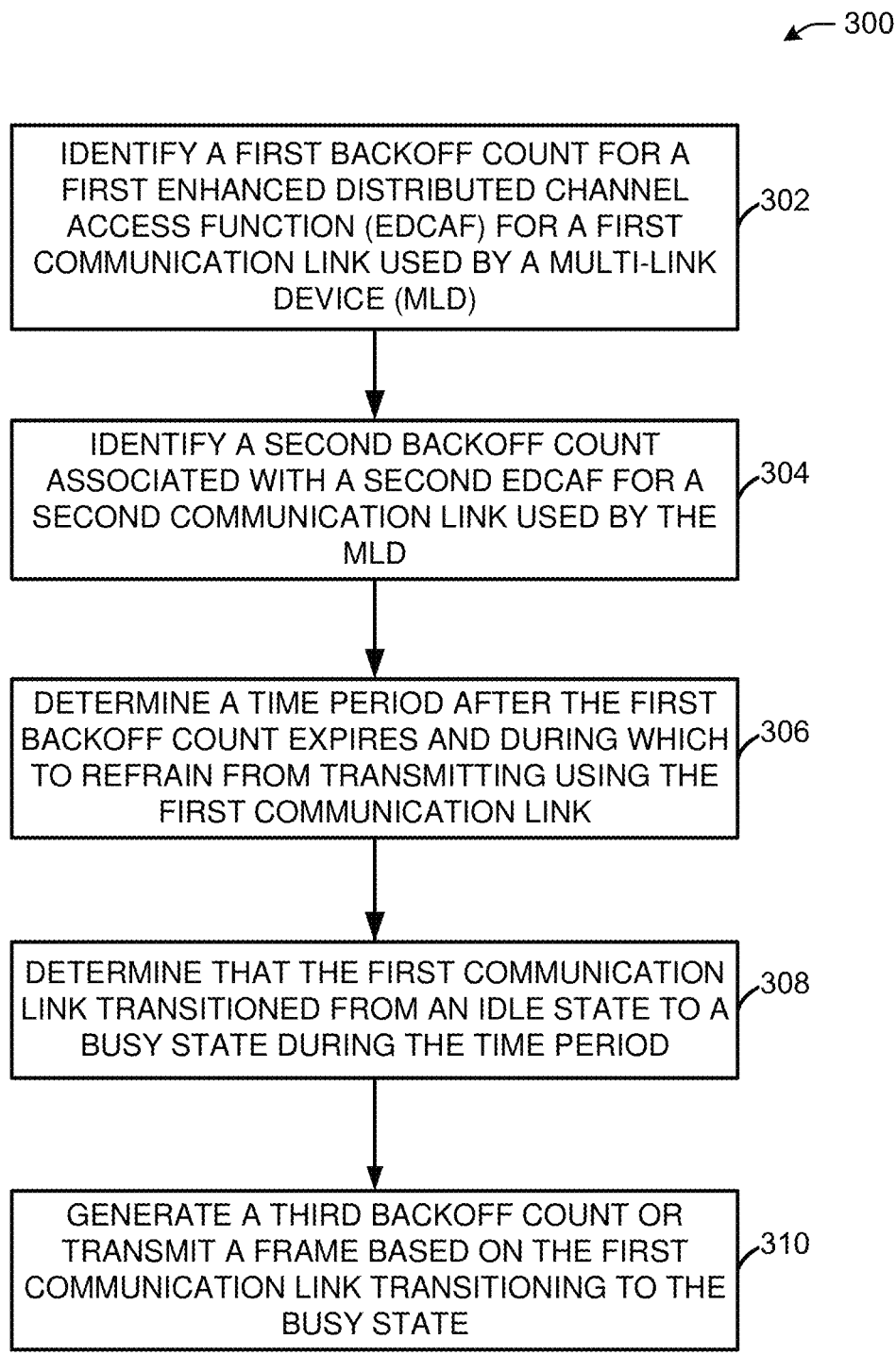
FIG. 3 illustrates a flow diagram of illustrative process for an illustrative enhanced channel access for MLDs, in accordance with one or more example embodiments of the present disclosure.

FIG. 3 illustrates a flow diagram of illustrative process 300 for an illustrative enhanced channel access for MLDs, in accordance with one or more example embodiments of the present disclosure.

At block 302, a device (e.g., the MLD 140 of FIG. 2D) may identify a first backoff count (e.g., the backoff period 210 of FIG. 2D) for a first EDCAF for a first communication link (e.g., the first link 142 of FIG. 2D) used by the MLD.

At block 304, the device may identify a second backoff count (e.g., the backoff period 212 of FIG. 2D) for s second EDCAF for a second communication link (e.g., the second link 144 of FIG. 2D) used by the MLD. The first and second backoff counts may expire at different times (e.g., may be unaligned). For example, the first backoff count may be shorter than (e.g., expire before) the second backoff count.

At block 306, the device may determine a time period (e.g., the time period 252 of FIG. 2D) after the first backoff count expires and during which to refrain from transmitting using the first communication link. The time period may be an extension of the first backoff count to align the first backoff count with the second backoff count (e.g., so that the device may transmit simultaneously using both the first and second communication links). The time period may be set to be equal to or less than the remaining time on the second backoff count before the second backoff count expires.

At block 308, the device may determine that the first communication link transitioned from an idle state to a busy state during the time period. For example, as shown in FIG. 2, while the device is waiting the extra time period determined at block 306, the first communication link may be idle at some point during the time period, and may transition to busy during the time period (e.g., before the time period expires). For example, the device 219 of FIG. 2D may use the second communication link at that time.

At block 310, the device may either generate a third backoff count or transmit a frame based on the first communication link having transitioned to the busy state during the time period.

It is understood that the above descriptions are for purposes of illustration and are not meant to be limiting.

FIG. 4 shows a functional diagram of an exemplary communication station 400, in accordance with one or more example embodiments of the present disclosure. In one embodiment, FIG. 4 illustrates a functional block diagram of a communication station that may be suitable for use as an AP 102 (FIG. 1A) or a user device 120 (FIG. 1A) in accordance with some embodiments. The communication station 400 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 400 may include communications circuitry 402 and a transceiver 410 for transmitting and receiving signals to and from other communication stations using one or more antennas 401. The communications circuitry 402 may include circuitry that can operate the physical layer (PHY) communications and/or medium access control (MAC) communications for controlling access to the wireless medium, and/or any other communications layers for transmitting and receiving signals. The communication station 400 may also include processing circuitry 406 and memory 408 arranged to perform the operations described herein. In some embodiments, the communications circuitry 402 and the processing circuitry 406 may be configured to perform operations detailed in the above figures, diagrams, and flows.

In accordance with some embodiments, the communications circuitry 402 may be arranged to contend for a wireless medium and configure frames or packets for communicating over the wireless medium. The communications circuitry 402 may be arranged to transmit and receive signals. The communications circuitry 402 may also include circuitry for modulation/demodulation, upconversion/downconversion, filtering, amplification, etc. In some embodiments, the processing circuitry 406 of the communication station 400 may include one or more processors. In other embodiments, two or more antennas 401 may be coupled to the communications circuitry 402 arranged for sending and receiving signals. The memory 408 may store information for configuring the processing circuitry 406 to perform operations for configuring and transmitting message frames and performing the various operations described herein. The memory 408 may include any type of memory, including non-transitory memory, for storing information in a form readable by a machine (e.g., a computer). For example, the memory 408 may include a computer-readable storage device, read-only memory (ROM), random-access memory (RAM), magnetic disk storage media, optical storage media, flash-memory devices and other storage devices and media.

In some embodiments, the communication station 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 400 may include one or more antennas 401. The antennas 401 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 400 may include one or more of a keyboard, a display, a non-volatile memory port, multiple antennas, a graphics processor, an application processor, speakers, and other mobile device elements. The display may be an LCD screen including a touch screen.

Although the communication station 400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 400 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station YY00 may include one or more processors and may be configured with instructions stored on a computer-readable storage device.

FIG. 5 illustrates a block diagram of an example of a machine 500 or system upon which any one or more of the techniques (e.g., methodologies) discussed herein may be performed. In other embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environments. The machine 500 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a power management device 532, a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The machine 500 may additionally include a storage device (i.e., drive unit) 516, a signal generation device 518 (e.g., a speaker), an enhanced channel access device 519, a network interface device/transceiver 520 coupled to antenna(s) 530, and one or more sensors 528, such as a global positioning system (GPS) sensor, a compass, an accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 502 for generation and processing of the baseband signals and for controlling operations of the main memory 504, the storage device 516, and/or the enhanced channel access device 519. The baseband processor may be provided on a single radio card, a single chip, or an integrated circuit (IC).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

The enhanced channel access device 519 may carry out or perform any of the operations and processes (e.g., process 300) described and shown above.

It is understood that the above are only a subset of what the enhanced channel access device 519 may be configured to perform and that other functions included throughout this disclosure may also be performed by the enhanced channel access device 519.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 6:
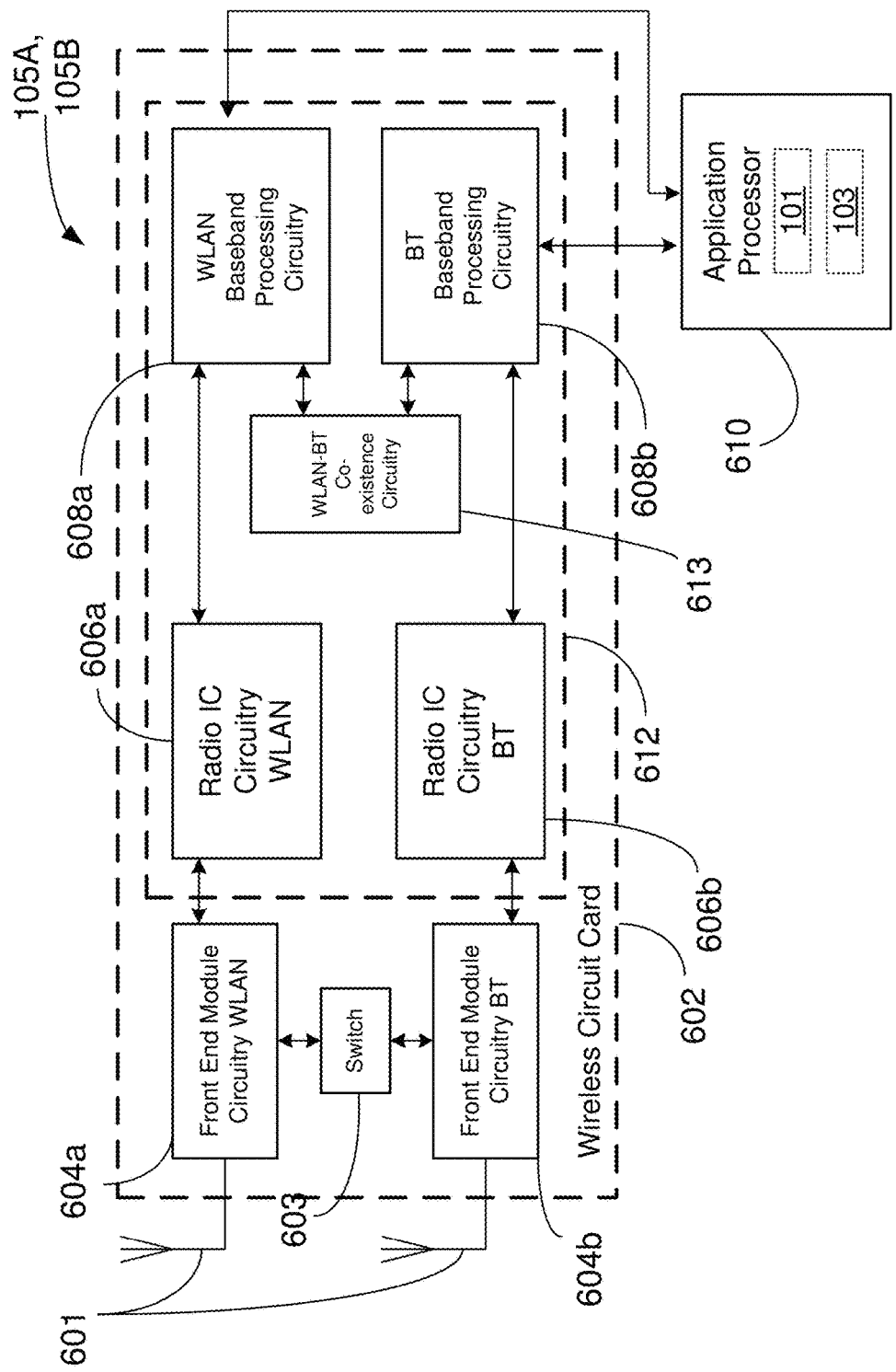
FIG. 6 is a block diagram of a radio architecture in accordance with some examples.

FIG. 6 is a block diagram of a radio architecture 105A, 105B in accordance with some embodiments that may be implemented in any one of the example AP 102 and/or the example STA 120 of FIG. 1A. Radio architecture 105A, 105B may include radio front-end module (FEM) circuitry XZX04a-b, radio IC circuitry XZX06a-b and baseband processing circuitry XZX08a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 604a-b may include a WLAN or Wi-Fi FEM circuitry 604a and a Bluetooth (BT) FEM circuitry 604b. The WLAN FEM circuitry 604a may include a receive signal path comprising circuitry configured to operate on WLAN RF signals received from one or more antennas 601, to amplify the received signals and to provide the amplified versions of the received signals to the WLAN radio IC circuitry 606a for further processing. The BT FEM circuitry 604b may include a receive signal path which may include circuitry configured to operate on BT RF signals received from one or more antennas 601, to amplify the received signals and to provide the amplified versions of the received signals to the BT radio IC circuitry 606b for further processing. FEM circuitry 604a may also include a transmit signal path which may include circuitry configured to amplify WLAN signals provided by the radio IC circuitry 606a for wireless transmission by one or more of the antennas 601. In addition, FEM circuitry 604b may also include a transmit signal path which may include circuitry configured to amplify BT signals provided by the radio IC circuitry 606b for wireless transmission by the one or more antennas. In the embodiment of FIG. 6, although FEM 604a and FEM 604b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 606a-b as shown may include WLAN radio IC circuitry 606a and BT radio IC circuitry 606b. The WLAN radio IC circuitry 606a may include a receive signal path which may include circuitry to down-convert WLAN RF signals received from the FEM circuitry 604a and provide baseband signals to WLAN baseband processing circuitry 608a. BT radio IC circuitry 606b may in turn include a receive signal path which may include circuitry to down-convert BT RF signals received from the FEM circuitry 604b and provide baseband signals to BT baseband processing circuitry 608b. WLAN radio IC circuitry 606a may also include a transmit signal path which may include circuitry to up-convert WLAN baseband signals provided by the WLAN baseband processing circuitry 608a and provide WLAN RF output signals to the FEM circuitry 604a for subsequent wireless transmission by the one or more antennas 601. BT radio IC circuitry 606b may also include a transmit signal path which may include circuitry to up-convert BT baseband signals provided by the BT baseband processing circuitry 608b and provide BT RF output signals to the FEM circuitry 604b for subsequent wireless transmission by the one or more antennas 601. In the embodiment of FIG. 6, although radio IC circuitries 606a and 606b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 608a-b may include a WLAN baseband processing circuitry 608a and a BT baseband processing circuitry 608b. The WLAN baseband processing circuitry 608a may include a memory, such as, for example, a set of RAM arrays in a Fast Fourier Transform or Inverse Fast Fourier Transform block (not shown) of the WLAN baseband processing circuitry 608a. Each of the WLAN baseband circuitry 608a and the BT baseband circuitry 608b may further include one or more processors and control logic to process the signals received from the corresponding WLAN or BT receive signal path of the radio IC circuitry 606a-b, and to also generate corresponding WLAN or BT baseband signals for the transmit signal path of the radio IC circuitry 606a-b. Each of the baseband processing circuitries 608a and 608b may further include physical layer (PHY) and medium access control layer (MAC) circuitry, and may further interface with a device for generation and processing of the baseband signals and for controlling operations of the radio IC circuitry 606a-b.

Referring still to FIG. 6, according to the shown embodiment, WLAN-BT coexistence circuitry 613 may include logic providing an interface between the WLAN baseband circuitry 608a and the BT baseband circuitry 608b to enable use cases requiring WLAN and BT coexistence. In addition, a switch 603 may be provided between the WLAN FEM circuitry 604a and the BT FEM circuitry 604b to allow switching between the WLAN and BT radios according to application needs. In addition, although the antennas 601 are depicted as being respectively connected to the WLAN FEM circuitry 604a and the BT FEM circuitry 604b, embodiments include within their scope the sharing of one or more antennas as between the WLAN and BT FEMs, or the provision of more than one antenna connected to each of FEM 604a or 604b.

In some embodiments, the front-end module circuitry 604a-b, the radio IC circuitry 606a-b, and baseband processing circuitry 608a-b may be provided on a single radio card, such as wireless radio card 602. In some other embodiments, the one or more antennas 601, the FEM circuitry 604a-b and the radio IC circuitry 606a-b may be provided on a single radio card. In some other embodiments, the radio IC circuitry 606a-b and the baseband processing circuitry 608a-b may be provided on a single chip or integrated circuit (IC), such as IC 612.

In some embodiments, the wireless radio card 602 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay, 802.11be, and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH- CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 608b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., SGPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 7:
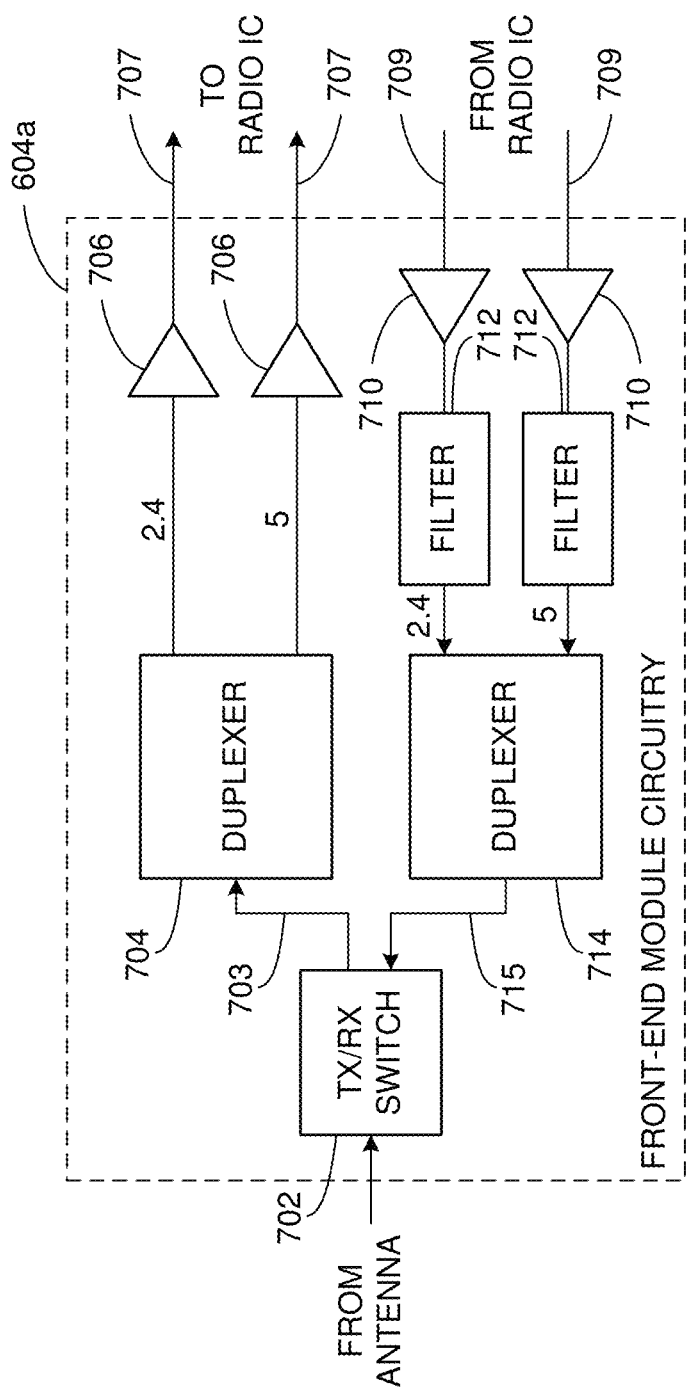
FIG. 7 illustrates an example front-end module circuitry for use in the radio architecture of FIG. 6, in accordance with one or more example embodiments of the present disclosure.

FIG. 7 illustrates WLAN FEM circuitry 604a in accordance with some embodiments. Although the example of FIG. 7 is described in conjunction with the WLAN FEM circuitry 604a, the example of FIG. 7 may be described in conjunction with the example BT FEM circuitry 604b (FIG. 6), although other circuitry configurations may also be suitable.

In some embodiments, the FEM circuitry 604a may include a TX/RX switch 702 to switch between transmit mode and receive mode operation. The FEM circuitry 604a may include a receive signal path and a transmit signal path. The receive signal path of the FEM circuitry 604a may include a low-noise amplifier (LNA) 706 to amplify received RF signals 703 and provide the amplified received RF signals 707 as an output (e.g., to the radio IC circuitry 606a-b (FIG. 6)). The transmit signal path of the circuitry 604a may include a power amplifier (PA) to amplify input RF signals 709 (e.g., provided by the radio IC circuitry 606a-b), and one or more filters 712, such as band-pass filters (BPFs), low-pass filters (LPFs) or other types of filters, to generate RF signals 715 for subsequent transmission (e.g., by one or more of the antennas 601 (FIG. 6)) via an example duplexer 714.

In some dual-mode embodiments for Wi-Fi communication, the FEM circuitry 604a may be configured to operate in either the 2.4 GHz frequency spectrum or the 5 GHz frequency spectrum. In these embodiments, the receive signal path of the FEM circuitry 604a may include a receive signal path duplexer 704 to separate the signals from each spectrum as well as provide a separate LNA 706 for each spectrum as shown. In these embodiments, the transmit signal path of the FEM circuitry 604a may also include a power amplifier 710 and a filter 712, such as a BPF, an LPF or another type of filter for each frequency spectrum and a transmit signal path duplexer 704 to provide the signals of one of the different spectrums onto a single transmit path for subsequent transmission by the one or more of the antennas 601 (FIG. 6). In some embodiments, BT communications may utilize the 2.4 GHz signal paths and may utilize the same FEM circuitry 604a as the one used for WLAN communications.

Figure 8:
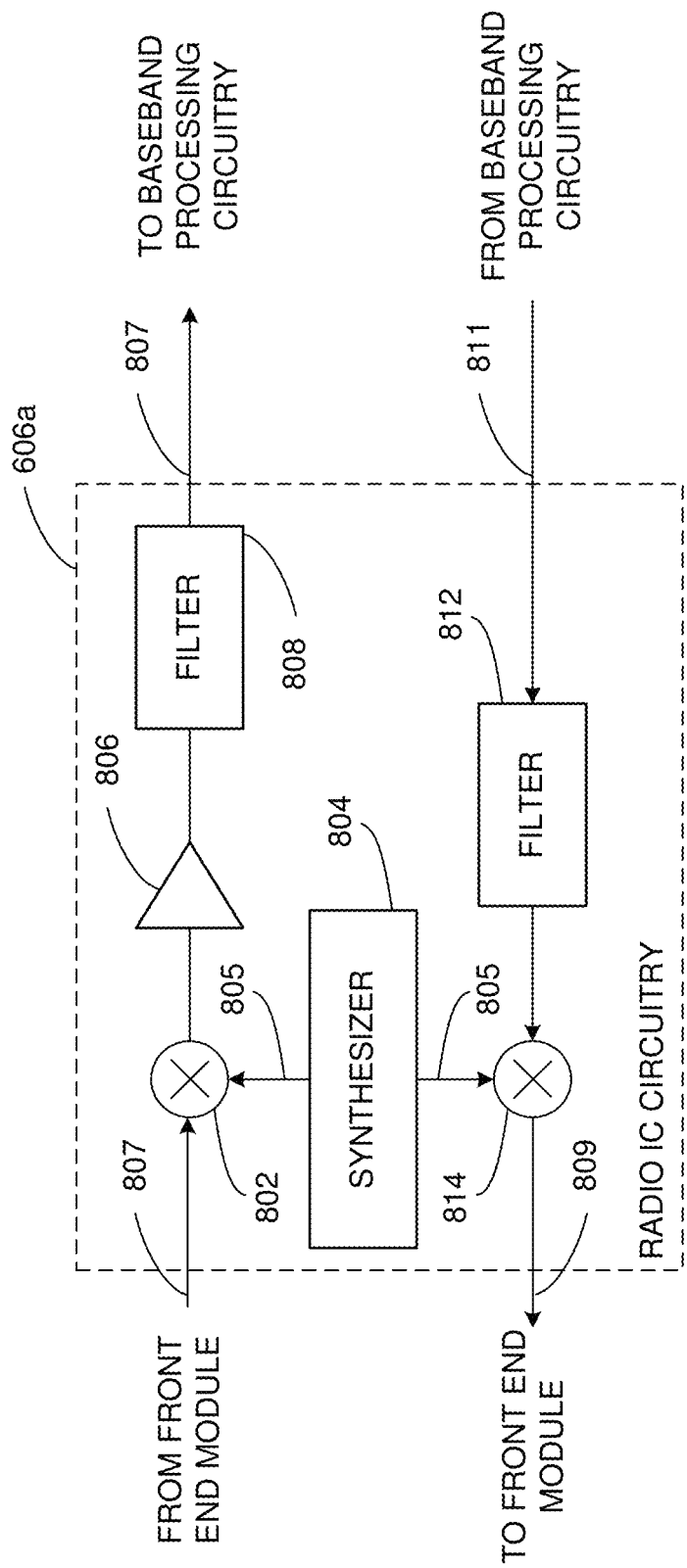
FIG. 8 illustrates an example radio IC circuitry for use in the radio architecture of FIG. 6, in accordance with one or more example embodiments of the present disclosure.

FIG. 8 illustrates radio IC circuitry 606a in accordance with some embodiments. The radio IC circuitry 606a is one example of circuitry that may be suitable for use as the WLAN or BT radio IC circuitry 606a/606b (FIG. 6), although other circuitry configurations may also be suitable. Alternatively, the example of FIG. 8 may be described in conjunction with the example BT radio IC circuitry 606b.

In some embodiments, the radio IC circuitry 606a may include a receive signal path and a transmit signal path. The receive signal path of the radio IC circuitry 606a may include at least mixer circuitry 802, such as, for example, down-conversion mixer circuitry, amplifier circuitry 806 and filter circuitry 808. The transmit signal path of the radio IC circuitry 606a may include at least filter circuitry 812 and mixer circuitry 814, such as, for example, up-conversion mixer circuitry. Radio IC circuitry 606a may also include synthesizer circuitry 804 for synthesizing a frequency 805 for use by the mixer circuitry 802 and the mixer circuitry 814. The mixer circuitry 802 and/or 814 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 8 illustrates only a simplified version of a radio IC circuitry, and may include, although not shown, embodiments where each of the depicted circuitries may include more than one component. For instance, mixer circuitry 814 may each include one or more mixers, and filter circuitries 808 and/or 812 may each include one or more filters, such as one or more BPFs and/or LPFs according to application needs. For example, when mixer circuitries are of the direct-conversion type, they may each include two or more mixers.

In some embodiments, mixer circuitry 802 may be configured to down-convert RF signals 707 received from the FEM circuitry 604a-b (FIG. 6) based on the synthesized frequency 805 provided by synthesizer circuitry 804. The amplifier circuitry 806 may be configured to amplify the down-converted signals and the filter circuitry 808 may include an LPF configured to remove unwanted signals from the down-converted signals to generate output baseband signals 807. Output baseband signals 807 may be provided to the baseband processing circuitry 608a-b (FIG. 6) for further processing. In some embodiments, the output baseband signals 807 may be zero-frequency baseband signals, although this is not a requirement. In some embodiments, mixer circuitry 802 may comprise passive mixers, although the scope of the embodiments is not limited in this respect.

In some embodiments, the mixer circuitry 814 may be configured to up-convert input baseband signals 811 based on the synthesized frequency 805 provided by the synthesizer circuitry 804 to generate RF output signals 709 for the FEM circuitry 604a-b. The baseband signals 811 may be provided by the baseband processing circuitry 608a-b and may be filtered by filter circuitry 812. The filter circuitry 812 may include an LPF or a BPF, although the scope of the embodiments is not limited in this respect.

In some embodiments, the mixer circuitry 802 and the mixer circuitry 814 may each include two or more mixers and may be arranged for quadrature down-conversion and/or up-conversion respectively with the help of synthesizer 804. In some embodiments, the mixer circuitry 802 and the mixer circuitry 814 may each include two or more mixers each configured for image rejection (e.g., Hartley image rejection). In some embodiments, the mixer circuitry 802 and the mixer circuitry 814 may be arranged for direct down-conversion and/or direct up-conversion, respectively. In some embodiments, the mixer circuitry 802 and the mixer circuitry 814 may be configured for super-heterodyne operation, although this is not a requirement.

Mixer circuitry 802 may comprise, according to one embodiment: quadrature passive mixers (e.g., for the in-phase (I) and quadrature phase (Q) paths). In such an embodiment, RF input signal 707 from FIG. 8 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 805 of synthesizer 804 (FIG. 8). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 707 (FIG. 7) may comprise a balanced signal, although the scope of the embodiments is not limited in this respect. The I and Q baseband output signals may be provided to low-noise amplifier, such as amplifier circuitry 806 (FIG. 8) or to filter circuitry 808 (FIG. 8).

In some embodiments, the output baseband signals 807 and the input baseband signals 811 may be analog baseband signals, although the scope of the embodiments is not limited in this respect. In some alternate embodiments, the output baseband signals 807 and the input baseband signals 811 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 804 may be a fractional-N synthesizer or a fractional N/N+1 synthesizer, although the scope of the embodiments is not limited in this respect as other types of frequency synthesizers may be suitable. For example, synthesizer circuitry 804 may be a delta-sigma synthesizer, a frequency multiplier, or a synthesizer comprising a phase-locked loop with a frequency divider. According to some embodiments, the synthesizer circuitry 804 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 804 may be provided by a voltage controlled oscillator (VCO), although that is not a requirement. A divider control input may further be provided by either the baseband processing circuitry 608a-b (FIG. 6) depending on the desired output frequency 805. In some embodiments, a divider control input (e.g., N) may be determined from a look-up table (e.g., within a Wi-Fi card) based on a channel number and a channel center frequency as determined or indicated by the example application processor 610. The application processor 610 may include, or otherwise be connected to, one of the example secure signal converter 101 or the example received signal converter 103 (e.g., depending on which device the example radio architecture is implemented in).

In some embodiments, synthesizer circuitry 804 may be configured to generate a carrier frequency as the output frequency 805, while in other embodiments, the output frequency 805 may be a fraction of the carrier frequency (e.g., one-half the carrier frequency, one-third the carrier frequency). In some embodiments, the output frequency 805 may be a LO frequency (fLO).

Figure 9:
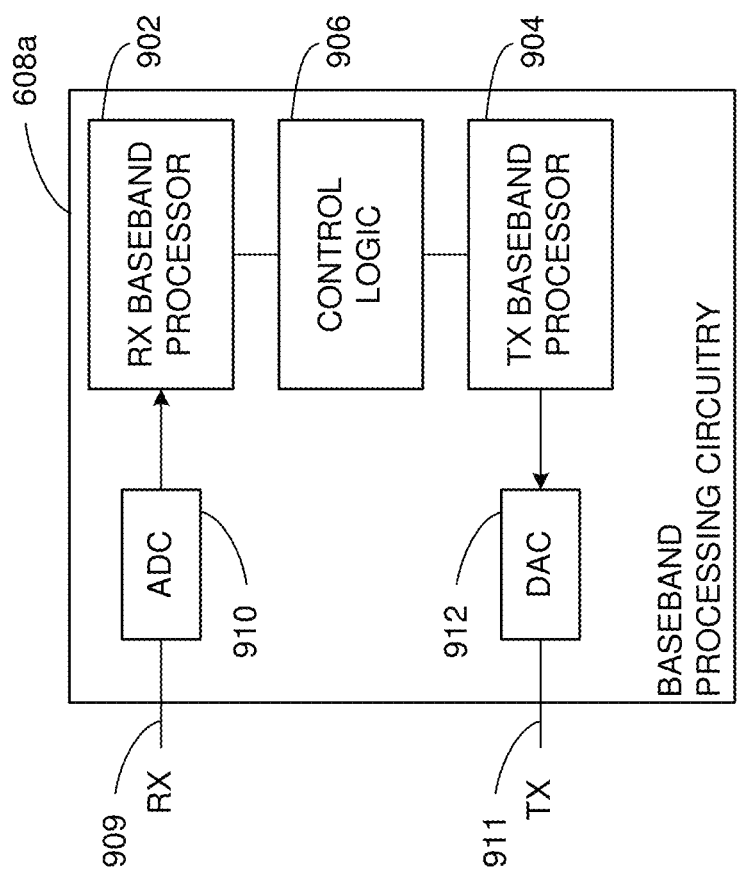
FIG. 9 illustrates an example baseband processing circuitry for use in the radio architecture of FIG. 6, in accordance with one or more example embodiments of the present disclosure.

FIG. 9 illustrates a functional block diagram of baseband processing circuitry 608a in accordance with some embodiments. The baseband processing circuitry 608a is one example of circuitry that may be suitable for use as the baseband processing circuitry 608a (FIG. 6), although other circuitry configurations may also be suitable. Alternatively, the example of FIG. 8 may be used to implement the example BT baseband processing circuitry 608b of FIG. 6.

The baseband processing circuitry 608a may include a receive baseband processor (RX BBP) 902 for processing receive baseband signals 809 provided by the radio IC circuitry 606a-b (FIG. 6) and a transmit baseband processor (TX BBP) 904 for generating transmit baseband signals 811 for the radio IC circuitry 606a-b. The baseband processing circuitry 608a may also include control logic 906 for coordinating the operations of the baseband processing circuitry 608a.

In some embodiments (e.g., when analog baseband signals are exchanged between the baseband processing circuitry 608a-b and the radio IC circuitry 606a-b), the baseband processing circuitry 608a may include ADC 910 to convert analog baseband signals 909 received from the radio IC circuitry XZX06a-b to digital baseband signals for processing by the RX BBP ZZZ02. In these embodiments, the baseband processing circuitry 608a may also include DAC 912 to convert digital baseband signals from the TX BBP 904 to analog baseband signals 911.

In some embodiments that communicate OFDM signals or OFDMA signals, such as through baseband processor 608a, the transmit baseband processor 904 may be configured to generate OFDM or OFDMA signals as appropriate for transmission by performing an inverse fast Fourier transform (IFFT). The receive baseband processor 902 may be configured to process received OFDM signals or OFDMA signals by performing an FFT. In some embodiments, the receive baseband processor 902 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 6, in some embodiments, the antennas 601 (FIG. 6) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 601 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may be a MLD comprising memory and processing circuitry configured to: identify a first backoff count associated with a first enhanced distributed channel access function (EDCAF) for a first communication link used by the MLD; identify a second backoff count associated with a second EDCAF for a second communication link used by the MLD, the first backoff count less than the second backoff count; determine a time period after that the first backoff count reaches zero and during which to refrain from transmitting using the first communication link, the time period based on the second backoff count; determine that the first communication link transitioned from an idle state to a busy state during the time period; and generate a third backoff count associated with the first EDCAF based on the first communication link transitioning to the busy state during the time period.

Example 2 may include the MLD of example 1 and/or some other example herein, wherein the time period is equal to or less than the second backoff count.

Example 3 may include the MLD of example 1 and/or some other example herein, wherein the first communication link transitioned from the idle state to the busy state prior to expiration of the first backoff count.

Example 4 may include the MLD of example 1 and/or some other example herein, wherein the processing circuitry is further configured to: determine, before expiration of the time period, a second time period during which to refrain from transmitting using the first communication link.

Example 5 may include the MLD of example 1 and/or some other example herein, wherein the processing circuitry is further configured to: determine that the time period has expired; determine that the second communication link is busy after the time period has expired; and transmit a frame using the first communication link based on the determination that the second communication link is busy after the time period has expired.

Example 6 may include the MLD of example 1 and/or some other example herein, wherein the processing circuitry is further configured to: determine that the time period has expired; determine that the second communication link transitioned from a second idle state to a second busy state after the time period has expired; and transmit a frame using the first communication link based on the determination that the second communication link transitioned from a second idle state to a second busy state after the time period has expired.

Example 7 may include the device of example 1 and/or some other example herein, further comprising a transceiver configured to transmit and receive wireless signals.

Example 8 may include the device of example 7 and/or some other example herein, further comprising an antenna coupled to the transceiver to cause to send the wireless signals.

Example 9 may include a non-transitory computer-readable medium storing computer-executable instructions which when executed by one or more processors result in performing operations comprising: identifying, by a multi-link device (MLD), a first backoff count associated with a first enhanced distributed channel access function (EDCAF) for a first communication link used by the MLD; identifying, by the MLD, a second backoff count associated with a second EDCAF for a second communication link used by the MLD, the first backoff count less than the second backoff count; determining, by the MLD, a time period after that the first backoff count reaches zero and during which to refrain from transmitting using the first communication link, the time period based on the second backoff count; determining, by the MLD, that the first communication link transitioned from an idle state to a busy state during the time period; and transmitting, by the MLD, a frame based on the first communication link transitioning to the busy state during the time period.

Example 10 may include the non-transitory computer-readable medium of example 9 and/or some other example herein, wherein the time period is equal to or less than the second backoff count.

Example 11 may include the non-transitory computer-readable medium of example 9 and/or some other example herein, wherein the first communication link transitioned from the idle state to the busy state prior to expiration of the first backoff count.

Example 12 may include the non-transitory computer-readable medium of example 9 and/or some other example herein, the operations further comprising: determining, before expiration of the time period, a second time period during which to refrain from transmitting using the first communication link.

Example 13 may include the non-transitory computer-readable medium of example 9 and/or some other example herein, the operations further comprising: determining that the time period has expired; determining that the second communication link is busy after the time period has expired; and transmitting a second frame using the first communication link based on the determination that the second communication link is busy after the time period has expired.

Example 14 may include the non-transitory computer-readable medium of example 9 and/or some other example herein, the operations further comprising: determining that the time period has expired; determining that the second communication link transitioned from a second idle state to a second busy state after the time period has expired; and transmitting a second frame using the first communication link based on the determination that the second communication link transitioned from a second idle state to a second busy state after the time period has expired.

Example 15 may include a method comprising: identifying, by a multi-link device (MLD), a first backoff count associated with a first enhanced distributed channel access function (EDCAF) for a first communication link used by the MLD; identifying, by the MLD, a second backoff count associated with a second EDCAF for a second communication link used by the MLD, the first backoff count less than the second backoff count; determining, by the MLD, a time period after that the first backoff count reaches zero and during which to refrain from transmitting using the first communication link, the time period based on the second backoff count; determining, by the MLD, that the first communication link transitioned from an idle state to a busy state during the time period; and generating, by the MLD, a third backoff count associated with the first EDCAF based on the first communication link transitioning to the busy state during the time period.

Example 16 may include the method of example 15 and/or some other example herein, wherein the time period is equal to or less than the second backoff count.

Example 17 may include the method of example 15 and/or some other example herein, wherein the first communication link transitioned from the idle state to the busy state prior to expiration of the first backoff count.

Example 18 may include the method of example 15 and/or some other example herein, further comprising: determining, before expiration of the time period, a second time period during which to refrain from transmitting using the first communication link.

Example 19 may include the method of example 15 and/or some other example herein, further comprising: determining that the time period has expired; determining that the second communication link is busy after the time period has expired; and transmitting a second frame using the first communication link based on the determination that the second communication link is busy after the time period has expired.

Example, 20 may include the method of example 15 and/or some other example herein, further comprising:

determining that the time period has expired; determining that the second communication link transitioned from a second idle state to a second busy state after the time period has expired; and transmitting a second frame using the first communication link based on the determination that the second communication link transitioned from a second idle state to a second busy state after the time period has expired.

Example 21 may include an apparatus comprising means for: identifying, by a multi-link device (MLD) a first backoff count associated with a first enhanced distributed channel access function (EDCAF) for a first communication link used by the MLD; identifying, by the MLD, a second backoff count associated with a second EDCAF for a second communication link used by the MLD, the first backoff count less than the second backoff count; determining, by the MLD, a time period after that the first backoff count reaches zero and during which to refrain from transmitting using the first communication link, the time period based on the second backoff count; determining, by the MLD, that the first communication link transitioned from an idle state to a busy state during the time period; and generating, by the MLD, a third backoff count associated with the first EDCAF based on the first communication link transitioning to the busy state during the time period.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A multi-link device (MLD), the MLD comprising processing circuitry coupled to storage, the processing circuitry configured to:
   identify a first backoff count associated with a first enhanced distributed channel access function (EDCAF) for a first communication link used by the MLD;
   identify a second backoff count associated with a second EDCAF for a second communication link used by the MLD, the first backoff count less than the second backoff count;
   determine a time period after that the first backoff count reaches zero and during which to refrain from transmitting using the first communication link, the time period based on the second backoff count;
   determine that the first communication link transitioned from an idle state to a busy state during the time period; and
   generate a third backoff count associated with the first EDCAF based on the first communication link transitioning to the busy state during the time period.

2. The MLD of claim 1, wherein the time period is equal to or less than the second backoff count.

3. The MLD of claim 1, wherein the first communication link transitioned from the idle state to the busy state prior to expiration of the first backoff count.

4. The MLD of claim 1, wherein the processing circuitry is further configured to:
   determine, before expiration of the time period, a second time period during which to refrain from transmitting using the first communication link.

5. The MLD of claim 1, wherein the processing circuitry is further configured to:
   determine that the time period has expired;
   determine that the second communication link is busy after the time period has expired; and
   transmit a frame using the first communication link based on the determination that the second communication link is busy after the time period has expired.

6. The MLD of claim 1, wherein the processing circuitry is further configured to:
   determine that the time period has expired;
   determine that the second communication link transitioned from a second idle state to a second busy state after the time period has expired; and
   transmit a frame using the first communication link based on the determination that the second communication link transitioned from a second idle state to a second busy state after the time period has expired.

7. The device of claim 1, further comprising a transceiver configured to transmit and receive wireless signals.

8. The device of claim 7, further comprising an antenna coupled to the transceiver.

9. A non-transitory computer-readable medium storing computer-executable instructions which when executed by one or more processors result in performing operations comprising:
   identifying, by a multi-link device (MLD), a first backoff count associated with a first enhanced distributed channel access function (EDCAF) for a first communication link used by the MLD;
   identifying, by the MLD, a second backoff count associated with a second EDCAF for a second communication link used by the MLD, the first backoff count less than the second backoff count;
   determining, by the MLD, a time period after that the first backoff count reaches zero and during which to refrain from transmitting using the first communication link, the time period based on the second backoff count;
   determining, by the MLD, that the first communication link transitioned from an idle state to a busy state during the time period; and
   transmitting, by the MLD, a frame based on the first communication link transitioning to the busy state during the time period.

10. The non-transitory computer-readable medium of claim 9, wherein the time period is equal to or less than the second backoff count.

11. The non-transitory computer-readable medium of claim 9, wherein the first communication link transitioned from the idle state to the busy state prior to expiration of the first backoff count.

12. The non-transitory computer-readable medium of claim 9, the operations further comprising:
   determining, before expiration of the time period, a second time period during which to refrain from transmitting using the first communication link.

13. The non-transitory computer-readable medium of claim 9, the operations further comprising:
   determining that the time period has expired;
   determining that the second communication link is busy after the time period has expired; and
   transmitting a second frame using the first communication link based on the determination that the second communication link is busy after the time period has expired.

14. The non-transitory computer-readable medium of claim 9, the operations further comprising:
   determining that the time period has expired;
   determining that the second communication link transitioned from a second idle state to a second busy state after the time period has expired; and
   transmitting a second frame using the first communication link based on the determination that the second communication link transitioned from a second idle state to a second busy state after the time period has expired.

15. A method comprising:
   identifying, by a multi-link device (MLD), a first backoff count associated with a first enhanced distributed channel access function (EDCAF) for a first communication link used by the MLD;

identifying, by the MLD, a second backoff count associated with a second EDCAF for a second communication link used by the MLD, the first backoff count less than the second backoff count;

determining, by the MLD, a time period after that the first backoff count reaches zero and during which to refrain from transmitting using the first communication link, the time period based on the second backoff count;

determining, by the MLD, that the first communication link transitioned from an idle state to a busy state during the time period; and generating, by the MLD, a third backoff count associated with the first EDCAF based on the first communication link transitioning to the busy state during the time period.

16. The method of claim 15, wherein the time period is equal to or less than the second backoff count.

17. The method of claim 15, wherein the first communication link transitioned from the idle state to the busy state prior to expiration of the first backoff count.

18. The method of claim 15, further comprising:
determining, before expiration of the time period, a second time period during which to refrain from transmitting using the first communication link.

19. The method of claim 15, further comprising:
determining that the time period has expired;
determining that the second communication link is busy after the time period has expired; and
transmitting a second frame using the first communication link based on the determination that the second communication link is busy after the time period has expired.

20. The method of claim 15, further comprising:
determining that the time period has expired;
determining that the second communication link transitioned from a second idle state to a second busy state after the time period has expired; and
transmitting a second frame using the first communication link based on the determination that the second communication link transitioned from a second idle state to a second busy state after the time period has expired.

* * * * *